United States Patent [19]
Kollen

[11] Patent Number: 4,633,829
[45] Date of Patent: Jan. 6, 1987

[54] ROTARY INTERNAL COMBUSTION ENGINE

[76] Inventor: Richard H. Kollen, Kerkstraat 48, 2242 HH Wassenaar, Netherlands

[21] Appl. No.: 780,987

[22] Filed: Sep. 27, 1985

[51] Int. Cl.$^4$ ............................................. F02B 53/00
[52] U.S. Cl. ................................................... 123/246
[58] Field of Search ................................ 123/213, 246

[56] References Cited

U.S. PATENT DOCUMENTS

| | | | |
|---|---|---|---|
| 3,115,124 | 12/1963 | Huthmacher | 123/246 |
| 3,323,499 | 6/1967 | Gijbeis | 123/246 |

FOREIGN PATENT DOCUMENTS

| | | | |
|---|---|---|---|
| 124284 | 3/1919 | United Kingdom | 123/246 |
| 1198625 | 7/1970 | United Kingdom | 123/246 |
| 1237704 | 6/1971 | United Kingdom | 123/204 |

*Primary Examiner*—Douglas Hart
*Attorney, Agent, or Firm*—Wender Murase & White

[57] ABSTRACT

A rotary internal combustion engine includes a housing having a pair of communicating rotor chambers and a pair of parallel axis rotors provided in each chamber. The rotors each have outer gear teeth and an inner chamber having a mixer. A fuel/air mixture introduced into the inner chambers is homogenized by the mixer and the resulting fuel/air mist is introduced into the areas between the outer gear teeth. Rotation of the rotors compresses the fuel/air mist between the outer gear teeth and, following ignition at a point proximate engagement of the teeth, the expanding exhaust gases create a rotational force driving the rotors. The exhaust gases are extracted via ports in the housing position immediately before the inlets for the air/fuel mist. Alternatively, the inner chamber may be used to compress air which is then directed toward a fuel injector nozzle.

20 Claims, 7 Drawing Figures

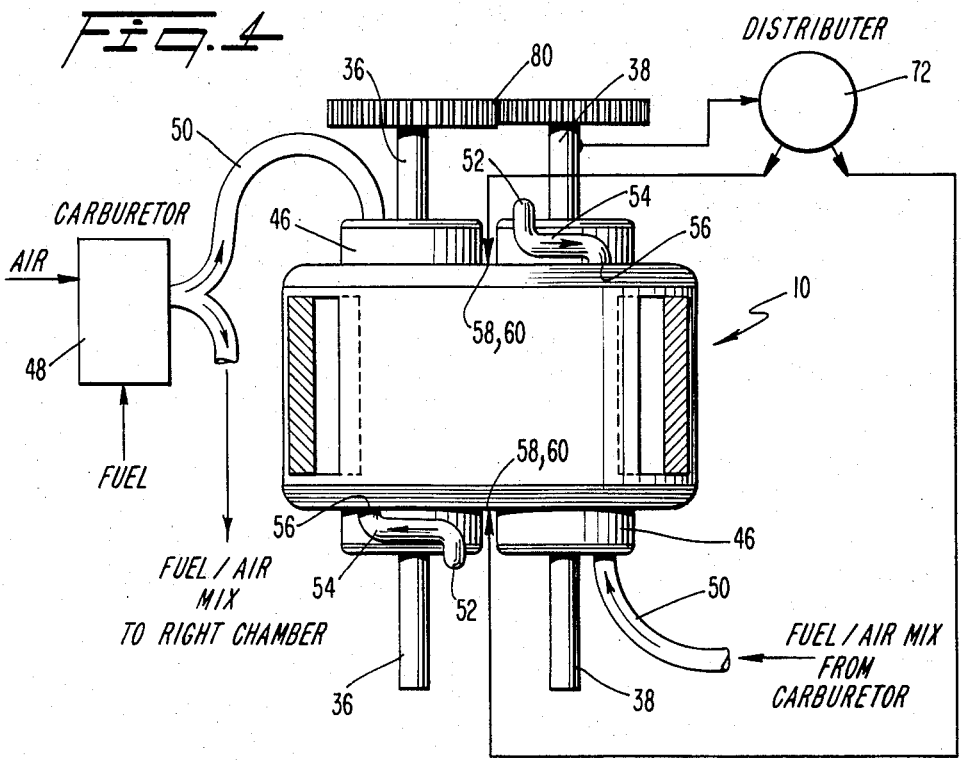
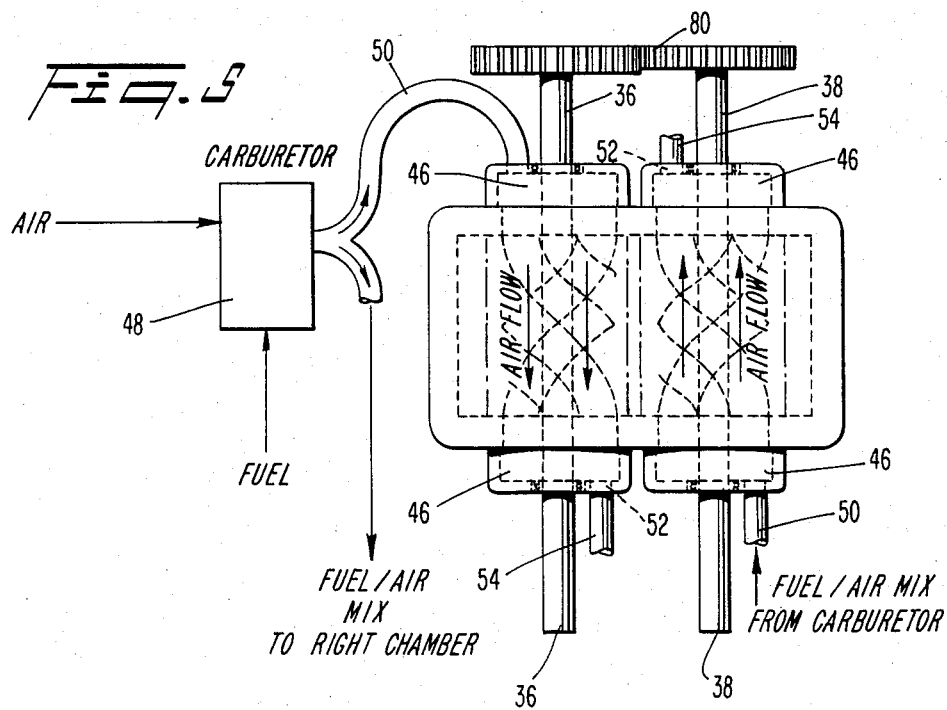

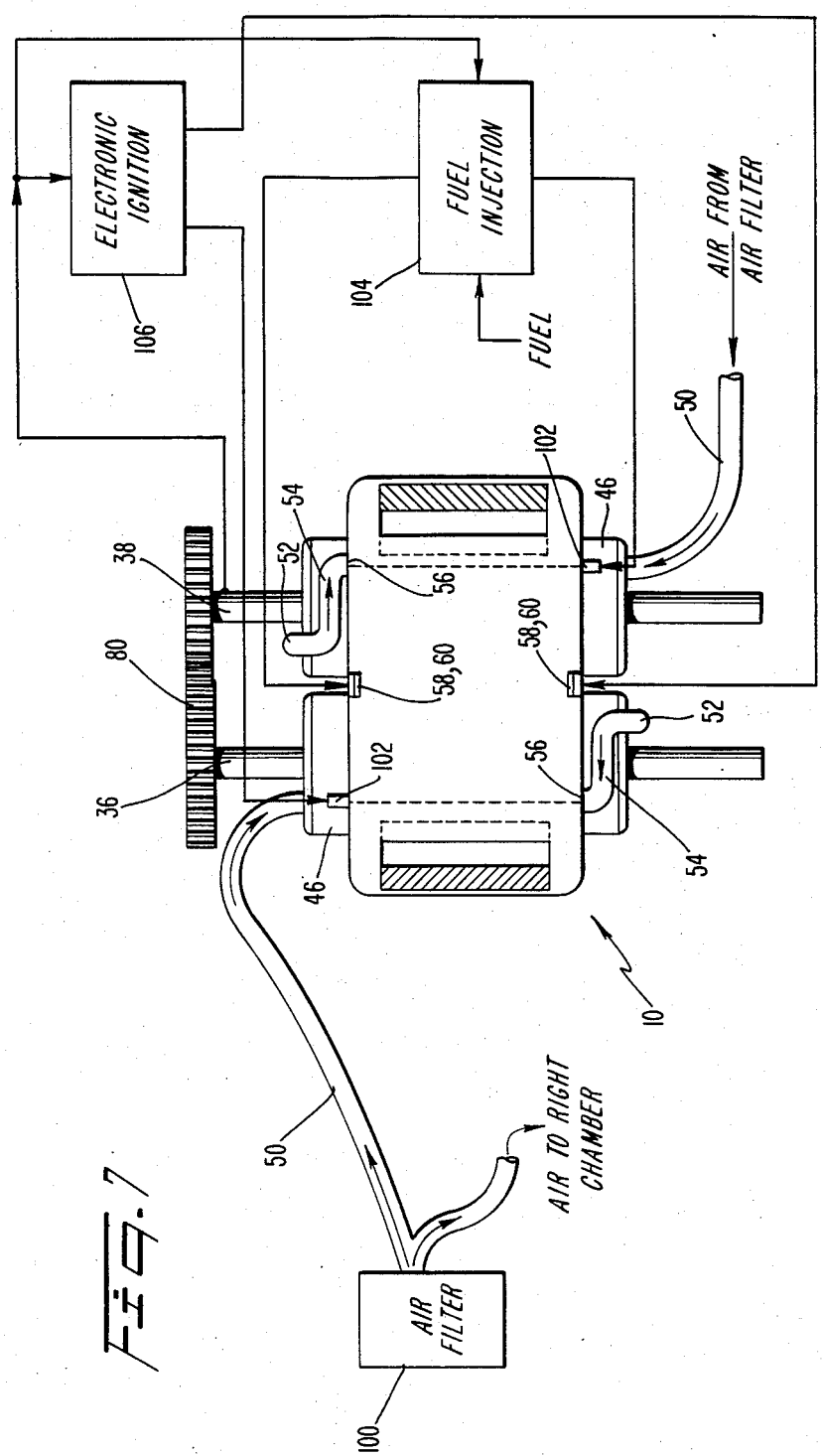

ROTARY INTERNAL COMBUSTION ENGINE

BACKGROUND OF THE INVENTION

1. Field of the Invention:

The present invention relates to the field of internal combustion engines and, more particularly, to a rotary internal combustion engine utilizing rotary chambers for treatment of a fuel/air mixture.

2. The Related Art:

Internal combustion engines are well-known in the art. Typically, such engines utilize a number of pistons, with each piston reciprocating in response to timed ignition of a fuel/air mixture introduced into the piston chamber. The pistons are directed against corresponding cam surfaces arranged on a chamshaft, permitting their individual reciprocating motions to be converted to a single rotational movement.

Many of the disadvantages of reciprocating piston engines stem from the complexity and intricacy of the many parts needed for their construction. Thus, not only are the manufacturing costs considerable, but the expenses of maintaining such engines in good running condition can be great. Furthermore, the reciprocating movement of the various pistons creates an inherent imbalance in the weight distribution of an operating engine.

To overcome some of the foregoing disadvantages, it is also known to restructure the pistons so as to utilize a rotary motion. An example of such an engine is the Wankel engine, popularized by the Japanese automobile manufacturer, Mazda. Another example of an improved internal combustion engine is disclosed in Dean, U.S. Pat. No. 4,182,301. The Dean engine utilizes a pair of counter-rotating rotors operating in communicating rotor chambers of a common housing. Each rotor includes a plurality of radially disposed pistons arranged for interengagement so as to form a combustion chamber therebetween. Ignition of a fuel/air mixture in the combustion chamber causes the corresponding piston to be driven backwards against a cam positioned in the central interior region of the respective rotor. By sequentially igniting the mixture in a series of pistons, rotary motion is achieved.

Although the Dean engine also overcomes certain of the disadvantages set forth above, it still requires a substantial number of discrete components to be implemented. Specifically, the radially disposed piston arrangement and corresponding cams require a large number of intricate, carefully-machined elements. Furthermore, no means are provided for treating the combustible air/fuel mixture so as to achieve superior burning.

SUMMARY OF THE INVENTION

Accordingly, it is an object of the present invention to provide a rotary internal combustion engine without utilizing reciprocating piston movement.

It is another object of the present invention to implement a rotary internal combustion engine having mixer/compressor chambers provided integrally therein, so as to achieve compression and superior mixing of fuel/air mixtures.

It is also an object of the present invention to provide an internal combustion engine characterized in operation by counter-balanced weight distribution and having a high torque/weight ratio.

A further present object of the present invention is to construct a rotary internal combustion engine comprising a minimum number of moving parts, leading to reduced manufacturing and maintenance costs.

Additional objects and advantages of the present invention will be set forth in part in the description that follows and in part will be obvious from the description or may be learned by practice of the invention. The objects and advantages of the invention may be realized and obtained by the methods and apparatus particularly pointed out in the appended claims.

To achieve the objects and in accordance with the purposes of the invention, as embodied and as broadly described herein, a rotary internal combustion engine operating on fuel and air, comprises: a housing having a pair of communicating parallel axis rotor chambers; a pair of parallel axis rotors, one in each chamber of the housing, the rotors each having on its outer periphery a plurality of circumferentially spaced axial teeth with a plurality of intervening circumferentially spaced axial passages, the rotors being positioned with the teeth and passages of one rotor engaging, respectively, the passages and teeth of the other rotor, each of the rotors further having an internal mixer chamber surrounding a plurality of axial generally cylindrical oblique helicoid walls forming a chamber; means for introducing a mixture of the fuel and air into the mixer chambers of the rotors whereby rotation of the rotors homogenizes the mixture to produce a fuel/air mist; means for transferring the mist from the mixer chambers to a predetermined injection point in the rotor chambers of the housing such that the mist is disposed in selected passages of the rotors as the selected passages rotate past the predetermined injection point; means for igniting the mist at a predetermined ignition point in the rotor chambers of the housing, the predetermined ignition point being proximate a combustion chamber formed by interengagement of the teeth of the rotors immediately adjacent the selected passages, whereby exhaust resulting from ignition of the mist urges expansion of the combustion chamber and causes rotation of the rotors; and means for extracting the exhaust as the selected passages rotate past a predetermined exhaust point in the rotor chambers of the housing, the predetermined exhaust point being located in the rotor chambers such that the selected passages of the rotors rotate past the predetermined exhaust point before rotating past the predetermined injection point.

Alternatively, the mixer chamber may be replaced by a compressor chamber. Additionally, fuel injector nozzles can be disposed directly opposite an outlet of the compressor chamber. The compressed air rushing out of the compressor chamber encounters the injected fuel head on, thus serving to thoroughly mix and dispense the fuel in a fine fuel-air mist.

The accompanying drawings, which are incorporated in and constitute a part of this specification, illustrate two embodiments of the invention and, together with the description, serve to explain the principles of the invention.

BRIEF DESCRIPTION OF THE DRAWINGS

FIG. 3 is a cross-sectional side view of the engine of FIG. 1;

FIG. 4 is a block diagram of the engine of FIG. 1 and related system components;

FIG. 5 is a block diagram of the engine of FIG. 1 showing the fuel/air flow through the engine;

FIG. 6 is a cross-sectional front view of a portion of the housing of the engine of FIG. 1; and FIG. 7 is a block diagram of a second embodiment of the engine according to the present invention.

DESCRIPTION OF THE PREFERRED EMBODIMENTS

Figure 1:
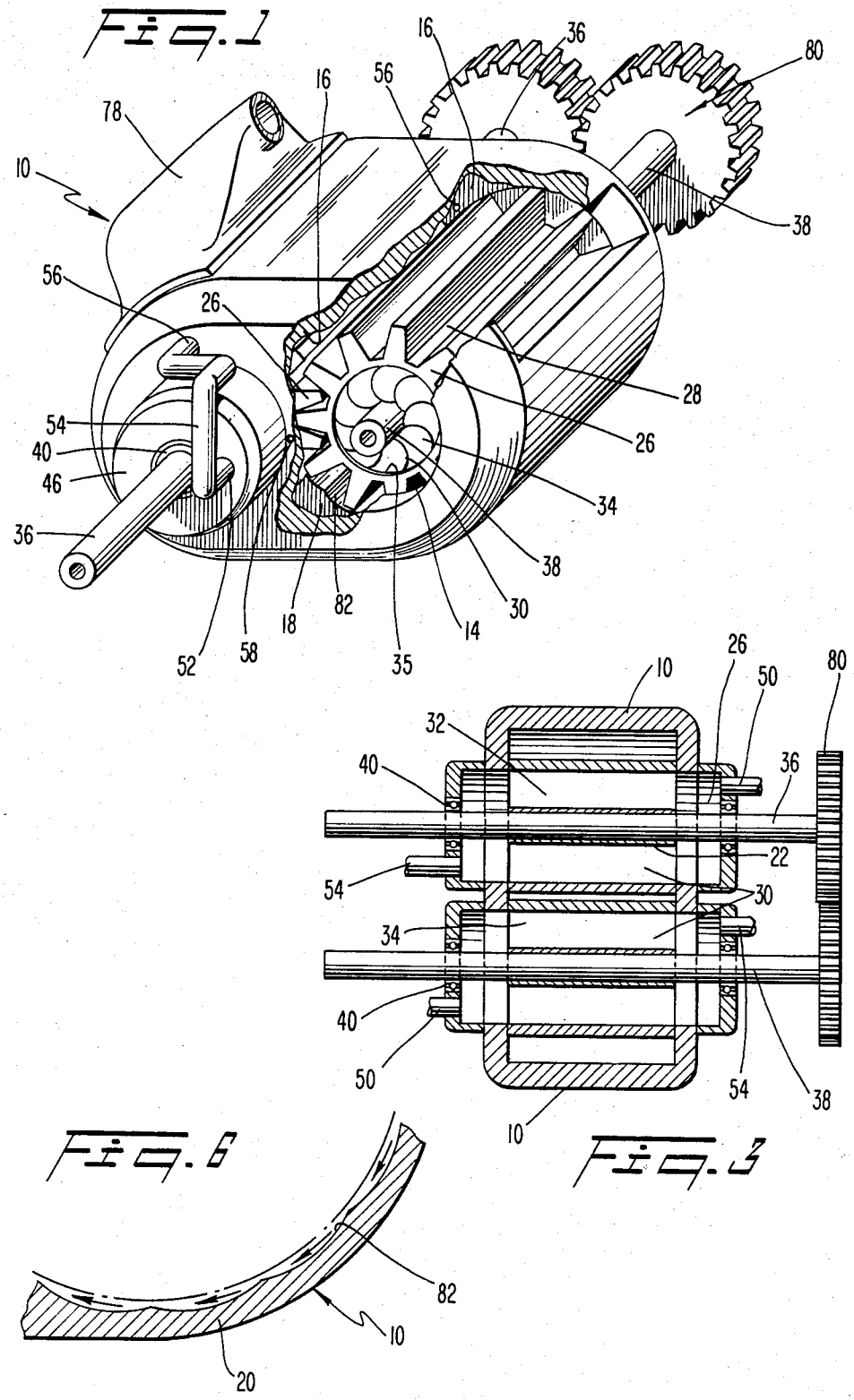
FIG. 1 is an exploded partial perspective view of a rotary internal combustion engine in accordance with the present invention.

Reference will now be made in detail to the presently preferred embodiments of the invention, examples of which are illustrated in the accompanying drawings. Throughout the drawings, like reference characters are used to designate like components.

Figure 2:
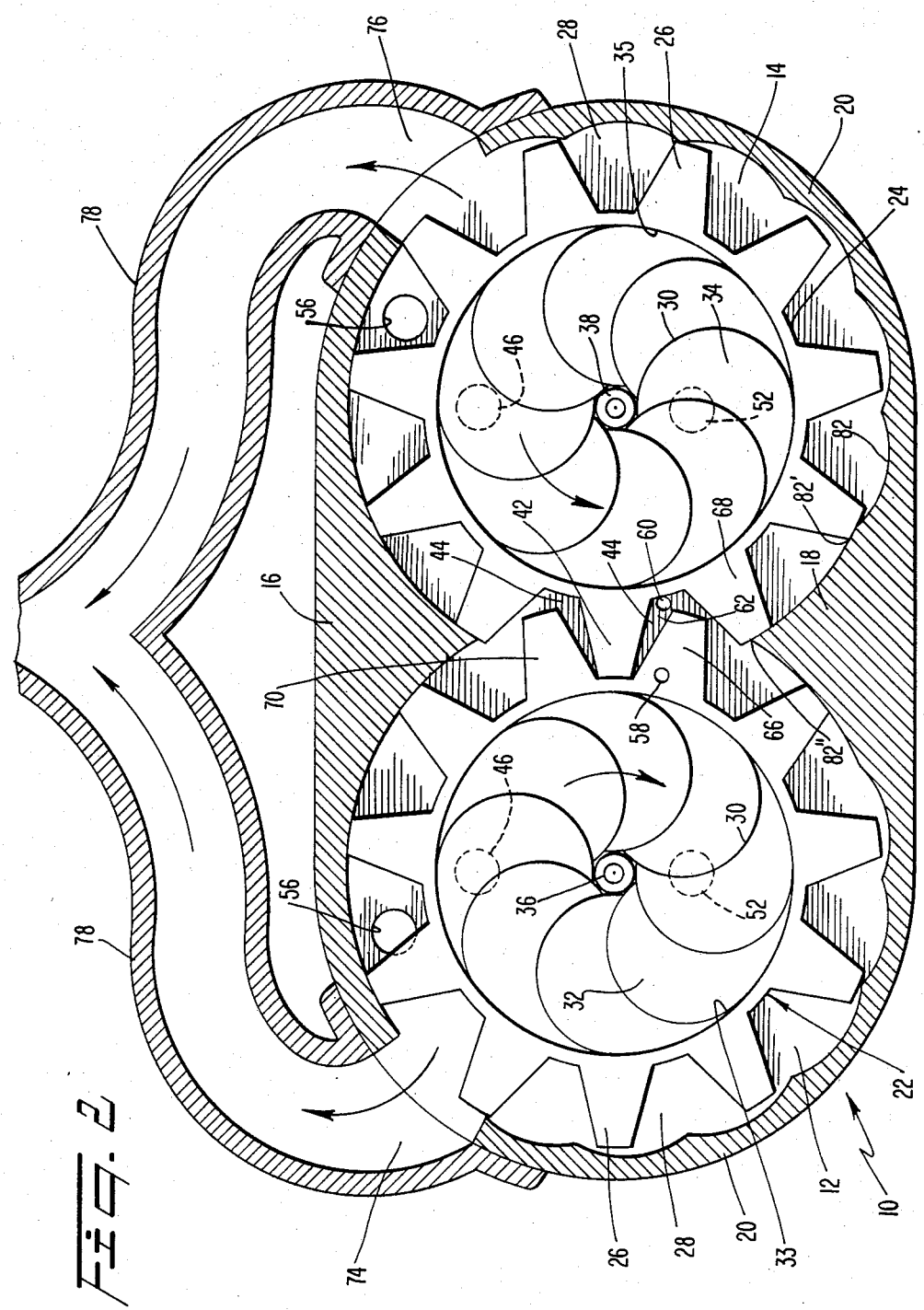
FIG. 2 is a cross-sectional front view of the engine of FIG. 1.

A first embodiment of the rotary internal combustion engine is shown in partial perspective view in FIG. 1 and cross-sectional view in FIG. 2. The engine is capable of operating on a mixture of a fuel and air. A wide variety of fuels may be used, including gasoline, gasohol, kerosene or any other combustible fuel. In this manner, the engine is capable of utilizing a convenient fuel source.

According to the present invention, a housing is provided having a pair of communicating parallel axis rotor chambers. As embodied herein, the housing is identified by reference character 10, and has a left rotary chamber 12 and a right rotary chamber 14. While the exterior surface of housing 10 is preferably a smooth oval shape having generally flat ends, the internal surfaces have a variety of contoured shapes as shown best in FIG. 2. As explained in further detail hereinbelow, the internal surfaces of housing 10 may be divided into three functional regions: a compression area 16; an expansion area 18; and an exhaust area 20. Compression area 16 and expansion area 18 are each located intermediate the communicating parallel rotor chambers 12 and 14, while the remaining portion of each rotor chamber comprises exhaust area 20.

Housing 10 may be constructed of aluminum, aluminum alloy, ceramics, iron, or other material which is suitable to withstand the pressure and heat generated in operation of the engine. The housing may be constructed in separate halves so as to ease assembly thereof, or in other ways contributing to ease of manufacture or maintenance. Furthermore, different construction materials may be used in the various portions of the housing depending upon the specific temperatures and pressures exerted upon the different housing portions.

According to the invention, a pair of parallel axis rotors are provided, one in each chamber of the housing, the rotors each having on its outer periphery a plurality of circumferentially spaced axial teeth with a plurality of intervening circumferentially spaced axial passsages, the rotors being positioned with the teeth and passages of one rotor engaging, respectively, the passages and teeth of the other rotor, each of the rotors further having an internal axial generally cylindrical oblique helicoid wall defining a mixer chamber. As embodied herein, the pair of parallel axis rotors comprise left rotor 22 and right rotor 24. Both rotors are provided with spaced axial teeth 26 having intervening circumferentially spaced axial passages 28. According to a presently preferred embodiment, between twenty and twenty-two teeth 26 are provided on the outer periphery of each of rotors 22 and 24.

The interior portion of each rotor 22, 24 is provided with a plurality of axial generally cylindrical oblique helicoid walls 30 serving to define blades of a left mixer 32 and a right mixer 34 in rotors 22 and 24, respectively. Mixers 32 and 34 comprise central shafts 36 and 38, respectively, and walls 30. The interior portion of each rotor 22, 24 defines respective mixer chambers 33, 35. Each mixers 32 and 34 is capable of exacting tremendous forces upon a gas or fuel/air mixture introduced into an upstream side of the respective mixer chamber 33 and 35, so as to produce compressed air or a finely homogenized fuel/air mist at the downstream end of the mixer chamber. The structure of such mixer chambers, comprising the helicoid walls, are described in detail in U.S. Pat. No. 3,401,676, which is incorporated herein by reference. Rotors 22 and 24, and in particular the walls 30 of mixers 32 and 34, may be constructed of aluminum, aluminum alloy or ceramics. Because the outer teeth 26 of rotors 22 and 24 will be exposed to pressures and high temperatures typically associated with combustion and resulting friction, it is especially important that the teeth 26 be constructed of materials capable of withstanding such conditions. For ease of manufacture, rotors 22 and 24 may be constructed in two pieces subsequently fitted together, i.e., a first piece including teeth 26 and a second piece including helicoid walls 30.

As shown best in cross-sectional view in FIG. 3, rotors 22 and 24 are rotatably mounted within housing 10 via central shafts 36 and 38, respectively. These shafts may be supported in the housing by bushings 40, which may comprise cylindrical bearings or a collar including ball bearings or other like bearing means. Shafts 36 and 38 are positioned so that the teeth 26 of rotors 22 and 24 are engage in interlocking fashion such that, as best shown in FIG. 2, a particular tooth 42 of rotor 24 engages the interior wall of a corresponding axial passage 44 of rotor 22. Conversely, the teeth 26 of rotor 22 likewise engage the axial passages 28 of rotor 24.

According to the invention, means are provided for introducing a mixture of the fuel and air into the mixer chambers 33, 35 of the rotors 22 and 24 whereby rotation of the rotors 22 and 24 correspondingly rotates the mixers 32 and 34, which homogenizes the mixture to produce a fuel/air mist. As embodied herein, these introducing means comprise inlet 46 provided in the wall of housing 10 proximate the upstream side of each of mixer chambers 33 and 35. The terms "upstream" and "downstream" as used herein refer to directions of movement of air or other substances from one point to another, i.e., from upstream to downstream. The relative positions of inlets 46 are illustrated most clearly in FIGS. 4 and 5.

As embodied herein, the introducing means may further comprise a carburetor 48 coupled to receive, individually, a supply of air and fuel. The outlet of carburetor 48 is, in turn, connected to inlet 46 by suitable tubing or hose 50. Carburetor 48 may comprise any one of many well-known designs capable of mixing air and fuel in various ratios in response to operation of a throttle control. Similarly, the construction of a means for supplying air and fuel to carburetor 48 are known in the art and, hence, is not germane to the spirit or scope of the present invention.

According to the invention, means are provided for transferring the mist from the mixer chambers 33 and 35 to a predetermined injection point in the rotor chambers 12 and 14 of the housing such that the mist is disposed in selected passages of the rotors 22 and 24 as the selected passages rotate past the predetermined injection point. As embodied herein, the transferring means include outlet 52, hoses 54 and inlets 56, as best shown in FIGS. 2, 4, and 5. Specifically, outlets 52 are provided in housing 10 proximate the downstream side of each of mixer chambers 33 and 35. Inlets 56, on the other hand, are provided in the housing proximate the outer gear teeth 26 and axial passages 28 of rotors 22 and 24. Hoses 54 are connected to housing 10 at inlets 56 and outlets 52 so as to provide communication of the homogenized fuel/air mist from inlet 52 to outlet 52. The hoses 54 may be coupled to the inlets 56 and outlets 52 by clamping means or other binding means known in the art.

As explained in further detail hereinbelow, a homogenized fuel/air mist produced at the downstream side of each of mixer chambers 33 and 35 is injected into the axial passages 28 between teeth 26 of rotors 22 and 24 via the transferring means. As each tooth 26 travels past corresponding inlet 56, the inlet is unblocked and the fuel/air mist is free to be injected into the intervening passage 28. Thus, inlets 56 define the predetermined injection point.

Also according to the present invention, means are provided for igniting the mist at a predetermined ignition point in the rotor chambers 12 and 14 of the housing. The predetermined ignition point is proximate a combustion chamber formed by interengagement of the teeth of the rotors immediately adjacent the selected passages, whereby exhaust resulting from ignition of the mist urges expansion of the combustion chamber and causes rotation of the rotors 22 and 24. As embodied herein, the igniting means include spark plugs 58 and 60, as shown in FIG. 2. The combustion chamber is designated by reference character 62. As explained in further detail hereinbelow, the fuel/air mist introduced at inlets 56 and disposed in the selected axial passages 28 is ignited by the ignition of the appropriate spark plug.

For the position of the rotors 22 and 24 illustrated in FIG. 2, combustion chamber 62 is defined by the closed region bounded by teeth 42 and 68 of rotor 24 and tooth 66 of rotor 22. In this situation, right spark plug 60 is used to ignite the mist contained therein. Conversely, further rotation of the rotors 22 and 24 in the manner described, hereinbelow would result in formation of a combustion chamber defined by teeth 66 and 70 of rotor 22 and tooth 42 of rotor 24. In the latter situation, the mist contained in the combustion chamber is ignited by left spark plug 58.

Although FIG. 2 illustrates use of two distinct spark plugs, it should also be recognized that various other ignition means may be employed without departing from the spirit or scope of the present invention. For example, a single spark plug positioned intermediate the locations shown for plugs 58 and 60 may be employed. Alternatively, four spark plugs may be positioned as illustrated in FIG. 2, with a first pair of plugs located proximate the combustion chamber at a front side of housing 10 and a second pair located in like fashion at a back side of housing 10. It is also possible to employ ignition means such as glow plugs, laser beams or other incendiary arrangements, all without departing from the spirit or scope of this invention.

As embodied herein, the igniting means may further include a distributor 72 as shown in FIG. 4. Distributor 72 may comprise any of several well-known designs capable of firing spark plugs 58 and 60 at predetermined intervals. So that the firing of the spark plugs can be precisely timed relative the formation of combustion chamber 62, information regarding the position of teeth 26 forming the combustion chamber may be derived by coupling the distributor to either of shafts 36, 38 of rotors 22 or 24. For example, shaft 38 may, through intermediate gears (not shown), drive the moving arm of distributor 72. Other coupling arrangements, such as optical sensors or Hall effect devices, may be used without departing from the spirit or scope of the present invention.

According to the invention, means are provided for extracting the exhaust as the selected passages rotate past a predetermined exhaust point in the rotor chambers 12 and 14 of the housing, said predetermined exhaust point being located in the rotor chamber such that the selected passages of the rotors 22 and 24 rotate past the predetermined exhaust point before rotating past the predetermined injection point. As embodied herein, the extracting means comprise exhaust ports 74 and 76 (FIG. 2) which may be connected to respective exhaust manifolds 78 (FIG. 1). Exhaust ports 74 and 76 are formed in housing 10 proximate gear teeth 26 of rotors 22 and 24, respectively, and immediately upstream of inlets 56. As shown best in FIG. 1, exhaust ports 74 and 76 are preferably elongated so as to correspond to the full axial dimension of passage 28. Manifolds 78 may be fitted over corresponding exhaust port 74 and 76 and secured to housing 10 by any suitable means, such as a conventional gasket and bolt arrangement. In view of the high temperatures typically associated with exhaust gases, manifolds 78 are preferably made of metal, although a ceramics material may be suitable.

As explained in detail hereinbelow, operation of the engine involves rotation of rotors 22 and 24 in opposite directions. In order to transfer this rotational movement to a drive shaft or the like, a set of gears 80 is provided, as shown in FIGS. 1 and 4. Gears 80 function as the transmission of the system, and thus may involve manually or automatically selectable gears of varying ratios so as to fully utilize the power of the inventive engine. Transmissions and other power-converting gear mechanisms are well known in the art and need not be explained in further detail for purposes of the present invention.

Operation of the present invention will now be explained in detail with reference to FIGS. 2, 4 and 15. In operation, rotors 22 and 24 turn in the direction of the arrows illustrated in the mixer chambers 33 and 35 in FIG. 2. As this occurs, a fuel/air mixture emitted by carburetor 48 is transmitted by hoses 50 to upstream chamber inlets 46. Due to the turbulent action of the mixer vanes, the fuel/air mixture is homogenized into a fine fuel/air mist that is dispensed at outlets 52 of the mixer chambers. The direction of air flow within the mixer chambers 33 and 35 is indicated by the arrows in FIG. 5.

The homogenized fuel-air mist is conveyed from outlets 52, through hoses 54, to housing inlets 56. Thus, as each tooth 26 goes past the corresponding inlet 56, the fuel/air mist rushes into the selected passage 28 which is in instantaneous communication with inlet 56. As the following tooth 26 adjacent the selected passage 28 rotates forward and blocks inlet 56, the loading of the fuel/air mist into the selected passage 28 is terminated. As can be seen from FIG. 2, the fuel/air mist is alternately loaded into selected passages of rotor 22 and then rotor 24.

As the rotors 22 and 24 rotate and the selected passages 28 charged with the fuel/air mist continue past the compression area 16 of housing 10, teeth 26 of the rotors 22 and 24 begin to mesh. As this action continues towards the area at which combustion chamber 62 is formed, the combustion chamber area, i.e., the size of the chamber defined by the interengaging teeth, becomes progressively smaller. This results in increased compression of the fuel/air mist. At the point when the selected passages 28 charged with the fuel/air mist are rotated into the proximity of the combustion chamber, one of plugs 58, 60 becomes axially aligned with the corresponding combustion chamber 62. At that point, the appropriate plug is energized resulting in ignition of the compressed fuel/air mist. In order for the combustion to result in continued rotation of the rotors, 22 and 24 ignition must occur after the combustion chamber has proceeded below, i.e. downstream, of an imaginary line connecting the two shafts 36, 38 and bisecting the housing 10.

Following energization of the appropriate spark plug, the resulting ignition burns the fuel/air mist to produce expanding exhaust gases. This exhaust exerts a driving force upon the surfaces of teeth 26 so as to rotate rotors 22 and 24 and further expand the dimensions of the combustion chamber 62. As the rotors 22 and 24 continue to rotate, the expanding exhaust gases continue to exert a driving force on the surfaces of teeth 26. The effect of this driving force may be magnified by providing scalloped or indented portions in the walls of housing 10 in the exhaust portions 20. Details of this structure are illustrated in FIG. 6. The scalloped or indented portions 82 provided in the wall of housing 10 serve to direct the driving force of the exhaust gas back towards the teeth 26 of the rotors. This brings about a windmilling effect which helps to perpetuate the effectiveness of the driving forces of the exhaust gas, longer than that achieved by plain or smooth housing walls.

The distance of the first scalloped area from the combustion chamber area is critical in that the first scalloped area acts to some extent as an exhaust valve. Thus, the leading edge 82' of the first scalloped area should not be farther from the interior wall edge 82" than the spacing between adjacent teeth 26, as shown in FIG. 2.

As the selected passage 28 containing the exhaust gas is rotated into the vicinity of exhaust ports 74 and 76, the exhaust is emitted through the ports and into exhaust manifold 78. The exhaust may then be disposed of in any of several well known manners, such as through an arrangement of mufflers and tail pipes. The centrifugal forces resulting from the speed of rotation of rotors 22 and 24 ensures effective removal of the exhaust gases in the vicinity of allied port 74 and 76. In the event any exhaust gas is not fully removed, however, the gas will merely be mixed with the fuel/air mist subsequently injected at inlets 56 as the selected passage becomes in communication therewith. Thus, subsequent combustion of the mist and exhaust in that selected passage results in increased burning of the exhaust and dissipation of any pollutants. Accordingly, the pollutant emissions from an engine according to the present invention are extremely low and may be maintained as such without the need for catalytic converters or other auxiliary devices.

With continued rotation of the rotors 22 and 24 as herein described, each passage 28 sequentially undergoes (1) injection of a fuel/air mist, (2) compression of the mist within the passage defined between engaging rotor teeth, (3) ignition of the compressed mist in the combustion chamber area, (4) rapid expansion of the exhaust gases, (5) and exiting of the exhaust gases. The sequence then begins anew, with the rotors 22 and 24 achieving speeds of 15–20,000 RPM. As noted above, this rotation may be coupled through transmission 80 so as to drive the wheels of an automobile or other machinery.

In order to initiate rotation of the rotors in the proper direction when the engine is first turned on, an auxiliary starter motor (not shown) may be coupled to either one of shafts 36 and 38 of rotors 22 and 24, respectively, or to transmission 80. In a well known fashion, switching on the engine causes electrical connection between a battery (not shown) and the starter motor, which effects rotation of the rotors. Once this initial rotation has commenced, operation of the engine may continue in the normal manner described above.

From the foregoing, it may be appreciated that the present invention provides for a rotary internal combustion engine having relatively few moving parts, leading to low cost, ease of maintenance and high reliability. The engine is balanced on its supporting platform, even in high speed operations, due to the counter rotating nature of the two opposing rotors 22 and 24. In addition to eliminating the need for reciprocating pistons, the present invention is advantageous in that only rolling frictional contact between the rotor teeth, as opposed to sliding frictional contact between piston and cylinder, is employed. Pollution emissions may be easily controlled as a result of efficient combustion in the combustion chamber of the present invention. Further, the turbulence, preheating, and extremely fine mixing provided by the internal mixer chambers results in lower emissions of unburned hydrocarbons, less stratification and reduced surface quenching. Accordingly, pollution control devices such as catalytic converters, air pumps and the like can be eliminated.

A second embodiment of the present invention is illustrated in FIG. 7 in which fuel injection, rather than normal carburetion, is utilized. Accordingly, the internal chambers are used merely to produce compressed air later employed for injecting the fuel, rather than to homogenize a fuel/air mixture. According to this embodiment, upstream compressor chamber inlets 46 receive air via hoses 50 from an air filter 100. The compressed air emanating from downstream chamber outlets 52 is provided to outer gear teeth 26 (not shown) at inlets 56 via hoses 54. Provided in the opposite side wall of housing 10 and directly opposite inlets 56 are fuel injector nozzles 102 receiving controlled amounts of fuel via a fuel injection pump 104. By locating the injector nozzles 102 directly opposite inlets 56, the compressed air rushing in via inlets 56 encounters headon the injected fuel, thus serving to thoroughly mix and dispense the fuel in a fine fuel/air mist. To insure that fuel injection is timed precisely with respect to the movement of rotors 22 and 24, fuel injection pump 104 may be coupled in any of numerous well-known ways to the rotors 22 and 24, such as via mechanical or electrical connection to shaft 38.

According to the second embodiment, electronic ignition means are provided to timely energize spark plugs 58 and 60 in the manner described hereinabove with respect to the first embodiment. Electronic ignition 106 may comprise any of several well known types, such as capacitive discharge, Hall effect, LED systems or the like. As with the case of fuel injection pump 104, electronic ignition 106 may also be coupled so as to be responsive to the positioning of the rotors 22 and 24. Thus, electronic ignition 106 may be coupled to shaft 38 or the like.

It should be understood that the various inlet and outlet ports have been illustrated herein as being generally circular in section solely for purposes of brevity and clarity, and that any desired sectional configuration may be utilized as may be appropriate.

It will be apparent to those skilled in the art that modifications and variations can be made in the rotary internal combustion engine of this invention. The invention in its broader aspects is, therefore, not limited to the specific details, representative methods and apparatus, and the illustrative examples shown and described hereinabove. Thus, it is intended that all matter containing the foregoing description or shown in the accompanying drawings shall be interpreted as illustrative and not in a limiting sense.

What is claimed is:

1. A rotary internal combustion engine operating on fuel and air, comprising:
    a housing having a pair of communicating parallel axis rotor chambers;
    a pair of parallel axis rotors, one in each rotor chamber of said housing, said rotors each having on its outer periphery a plurality of circumferentially spaced axial teeth with a plurality of intervening circumferentially spaced axial passages, said rotors being positioned with said teeth and passages of one rotor engaging, respectively, said passages and teeth of the other rotor, and each of said rotors further having an internal mixer chamber surrounding a plurality of axial generally cylindrical oblique helicoid walls forming a mixer means;
    mean for introducing a mixture of the fuel and air into said mixer chambers of said rotors whereby rotation of said rotors correspondingly rotates said mixer means to homogenize said mixture to produce a fuel/air mist;
    means for transferring said mist from said mixer chambers to a predetermined injection point in said rotor chambers of said housing such that said mist is disposed in selected passages of said rotors as said selected passages rotate past said predetermined injection point;
    means for igniting said mist at a predetermined ignition point in said rotor chambers of said housing, said predetermined ignition point being proximate a combustion chamber formed by interengagement of the teeth of said rotors immediately adjacent said selected passages, whereby exhaust resulting from ignition of said mist urges expansion of said combustion chamber and causes rotation of said rotors; and
    means for extracting said exhaust as said selected passages rotate past a predetermined exhaust point in said rotor chambers of said housing, said predetermined exhaust point being located in said rotor chambers such that said selected passages of said rotors rotate past said predetermined exhaust point before rotating past said predetermined injection point.

2. The rotary internal combustion engine recited in claim 1, wherein said introducing means includes a carburetor means for producing the mixture of fuel and air.

3. The rotary internal combustion engine recited in claim 1, wherein said transferring means includes tubing means having a first end coupled to said housing proximate said mixer chamber, and a second end coupled to said housing proximate said predetermined injection point.

4. The rotary internal combustion engine recited in claim 1, wherein said igniting means includes at least one spark plug means disposed in said housing in igniting communication with said combustion chamber.

5. The rotary internal combustion engine recited in claim 1, wherein said igniting means includes a pair of spark plug means, each one of said spark plug means being located in said housing in igniting communication with said combustion chamber.

6. The rotary internal combustion engine recited in claim 1, wherein said igniting means includes means for sensing movement of said rotors and for igniting said mist in response to positioning of said selected passages proximate said predetermined ignition point.

7. The rotary internal combustion engine as recited in claim 6, wherein said sensing means includes a distributor means coupled to said rotors.

8. The rotary internal combustion engine as recited in claim 1, wherein said extracting means includes an outlet port positioned in said housing at said predetermined exhaust point.

9. The rotary internal combustion engine as recited in claim 1, wherein said housing has an inner wall provided with a plurality of grooves in the region extending substantially from said ignition point to said exhaust point.

10. A rotary internal combustion engine operating on fuel and air, comprising:
    a housing having a pair of communicating parallel axis rotor chambers;
    a pair of parallel axis rotors, one in each chamber of said housing, each said rotor having on its outer periphery a plurality of circumferentially spaced axial teeth with a plurality of intervening circumferentially spaced axial passages, said rotors being positioned with said teeth and passages of one rotor engaging, respectively, said passages and teeth of the other rotor, and each of said rotors further having an internal compressor chamber surrounding a plurality of axial generally cylindrical oblique helicoid walls forming a compressor means;
    means for introducing the air into at least one of said compressor chambers of said rotors whereby rotation of said rotors compresses the air;
    means for transferring said compressed air exiting from said at least one of said compressor chambers to a predetermined injection point in said rotor chambers of said housing such that said compressed air is disposed in selected passages of said rotors as said selected passages rotate past said predetermined injection point;
    means for injecting the fuel into said selected passages of said rotors proximate said predetermined injection point, said fuel and compressed air combining to form a fuel/air mist disposed in said selected passages of said rotors;
    means for igniting said mist at a predetermined ignition point in said rotor chambers of said housing, said predetermined ignition point begin proximate a combustion chamber formed by interengagement of the teeth of said rotors immediately adjacent said selected passages, whereby exhaust resulting from ignition of said mist urges expansion of said combustion chamber and causes rotation of said rotors; and means for extracting said exhaust as said selected passages rotate past a predetermined exhaust point in said rotor chambers of said housing, said predetermined exhaust point being located in said rotor chambers such that said selected passages of said rotors rotate past said predetermined exhaust point before rotating past said predetermined injection point.

11. The rotary internal combustion engine as recited in claim 10, wherein said injecting means includes a fuel pump means.

12. The rotary internal combustion engine as recited in claim 10, wherein said injecting means is coupled to said rotors for sensing positioning of said selected passages within said rotor chambers.

13. The rotary internal combustion engine as recited in claim 10, wherein said igniting means includes at least one spark plug means.

14. The rotary internal combustion engine as recited in claim 10, wherein said igniting means includes a pair of spark plug means, each spark plug means being located in said housing proximate a different one of said rotors.

15. The rotary internal combustion engine as recited in claim 10, wherein said igniting means is coupled to said rotors for sensing positioning of said selected passages.

16. The rotary internal combustion engine as recited in claim 15, wherein said igniting means includes electronic ignition means.

17. The rotary internal combustion engine as recited in claim 10, wherein said extracting means includes ports provided in said housing proximate said predetermined exhaust points.

18. The rotary internal combustion engine as recited in claim 10, wherein said housing has inner walls provided with a plurality of grooves in a region in said rotor chambers extending substantially from said ignition point to said exhaust point.

19. A generally cylindrical rotor for use in a rotary internal combustion engine operating on fuel and air, said rotor having on its outer periphery a plurality of circumferentially spaced axial teeth with a plurality of intervening circumferentially spaced axial passages, said rotor being adapted to cooperate with a like rotor to form combustion chambers by interengagement of the teeth and passages of said rotor with the passages and teeth, respectively, of said like rotor; said rotor further having an internal mixer chamber extending axially therethrough and defined by a plurality of axial generally cylindrical oblique helicoid walls for homogenizing a fuel/air mixture prior to its introduction into said chambers.

20. The rotor is recited in claim 19 constructed as a unitary member.

* * * * *